United States Patent [19]

Herschler

[11] Patent Number: 4,534,779
[45] Date of Patent: Aug. 13, 1985

[54] METHOD AND APPARATUS FOR HEATING A MINERAL FIBER FORMING SPINNER

[75] Inventor: Max G. Herschler, Newark, Ohio

[73] Assignee: Owens-Corning Fiberglas Corporation, Toledo, Ohio

[21] Appl. No.: 641,248

[22] Filed: Aug. 16, 1984

Related U.S. Application Data

[63] Continuation-in-part of Ser. No. 452,272, Dec. 22, 1982, abandoned.

[51] Int. Cl.³ .............................................. C03B 37/04
[52] U.S. Cl. ................................................. 65/6; 65/14
[58] Field of Search ........................................ 65/6, 14

[56] References Cited

U.S. PATENT DOCUMENTS

| | | | |
|---|---|---|---|
| Re. 24,708 | 9/1959 | Heymes et al. | 65/14 |
| 2,949,631 | 8/1960 | Kleist et al. | 65/14 |
| 3,007,196 | 11/1961 | Levecque et al. | 65/14 |
| 3,197,507 | 4/1965 | Levecque et al. | |
| 3,346,356 | 10/1967 | Anderson et al. | 65/14 |
| 3,622,293 | 11/1971 | Firnhaber | 65/6 X |
| 3,775,076 | 11/1973 | Pallo | |
| 3,785,791 | 1/1974 | Perry | 65/14 |
| 3,841,854 | 10/1974 | Periat et al. | |
| 3,928,009 | 12/1975 | Perry | 65/14 |
| 4,058,386 | 11/1977 | Faulkner et al. | 65/6 |

FOREIGN PATENT DOCUMENTS

| | | | |
|---|---|---|---|
| 186364 | 11/1963 | Sweden | 65/14 |
| 685641 | 9/1979 | U.S.S.R. | 65/14 |

Primary Examiner—Robert Lindsay
Attorney, Agent, or Firm—Ronald C. Hudgens; Ted C. Gillespie

[57] ABSTRACT

Apparatus for fiberizing molten mineral material comprises a spinner having an orificed peripheral wall through which the molten mineral material passes to form mineral fibers, a burner mounted to direct hot gases toward the interior of the peripheral wall, an opening in the spinner for venting the gases from the spinner, and means for directing the vented hot gases toward the peripheral wall.

10 Claims, 1 Drawing Figure

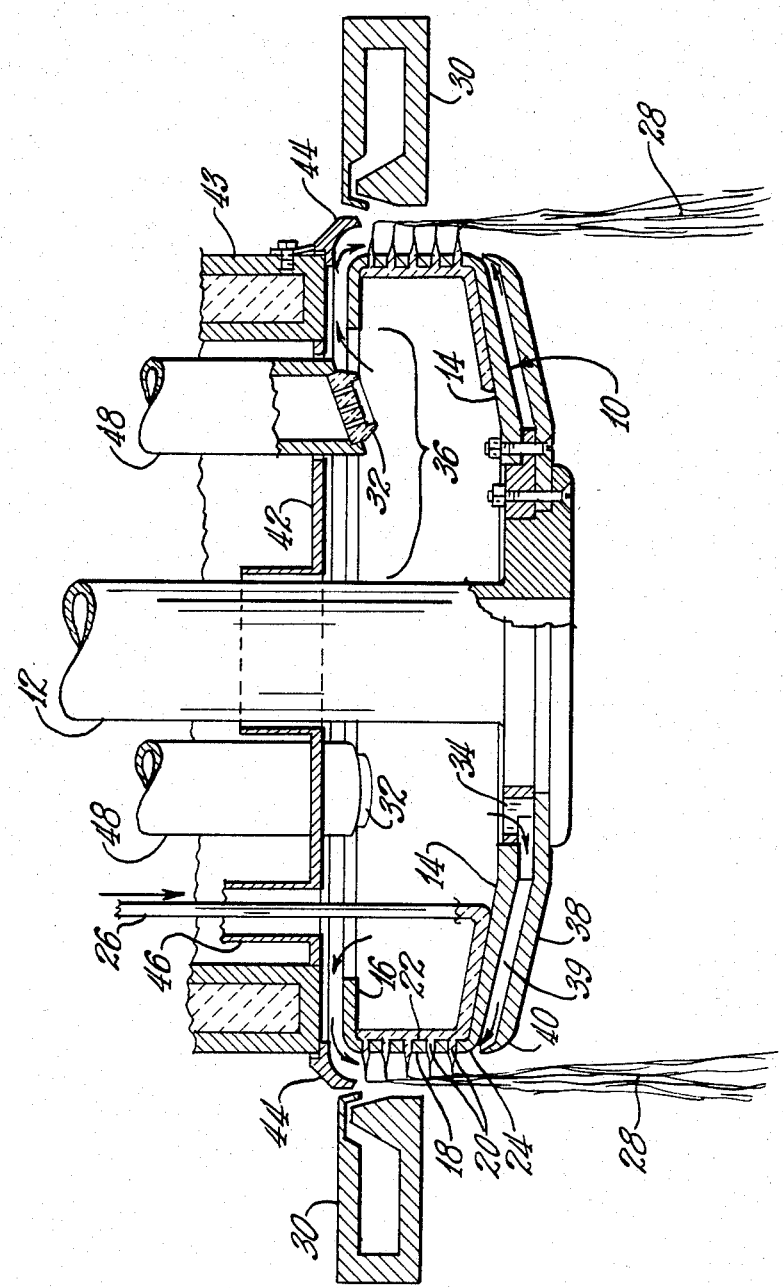

METHOD AND APPARATUS FOR HEATING A MINERAL FIBER FORMING SPINNER

This application is a continuation-in-part of U.S. patent application Ser. No. 452,272, filed Dec. 22, 1982 now abandoned.

TECHNICAL FIELD

This invention pertains to forming fibers from molten mineral material, such as forming glass fibers from molten glass for insulation products. In one of its more specific aspects, this invention relates to supplying molten mineral material to a centrifuge, and centrifuging the molten mineral material into mineral fibers.

BACKGROUND OF THE INVENTION

A common practice in forming fibers of mineral material, such as glass, is to discharge molten glass from a forehearth into a rotating centrifuge or spinner. The molten glass flows across the spinner bottom wall to the spinner peripheral wall and passes in a molten state through the orifices of the spinner peripheral wall to create glass fibers. In some of the fiber producing apparatus, burners are positioned to direct flows of hot gases or products of combustion into contact with the molten glass within the spinner, and with the spinner bottom and peripheral walls to maintain the glass at a sufficiently elevated temperature for proper fiberizing.

One of the problems with fiberizers utilizing internal burners is that it is difficult to maintain a uniform temperature along the entire height of the spinner peripheral wall. The top portion of the spinner peripheral wall is too cool for proper fiberization, and results in fibers which are too large in diameter. Also, the air currents created by the blower external from the spinner can result in a flow of relatively cool gases adjacent the lower portion of the spinner peripheral wall, thereby increasing the temperature gradient along the height of the spinner peripheral wall. Another problem involved with fiberizers utilizing an internal burner is that of disposing of the gases of combustion after they have impinged on the glass and spinner bottom and peripheral walls.

This invention is directed toward the solution of the above problems by providing an opening in the spinner for venting the hot gases from the spinner, and means for directing the vented hot gases toward the spinner peripheral wall.

DESCRIPTION OF THE DRAWINGS

The FIGURE illustrates a fiberizer for carrying out the disclosed invention.

STATEMENT OF THE INVENTION

According to this invention, there is provided apparatus for fiberizing molten mineral material comprising a spinner having an orificed peripheral wall through which the molten mineral material passes to form mineral fibers, a burner mounted to direct hot gases toward the interior of the peripheral wall, an opening in the spinner for venting the hot gases from the spinner, and means for directing the vented hot gases toward the peripheral wall. The vented hot gases are directed radially outwardly from the spinner, across either the spinner top wall or the spinner bottom wall, or both. The vented gases are then directed into the fiberizing area or region of fiber attenuation in order to maintain the environment in the fiber attenuation zone at a sufficiently high temperature for efficient fiberization of the glass.

In a specific embodiment of the invention, the opening is positioned in the spinner bottom wall, and the means for directing is positioned beneath the spinner bottom wall.

In another specific embodiment of the invention, the means for directing comprises an annular member.

In a preferred embodiment of the invention, a deflector member is positioned at the outer edge of the annular member to deflect the vented gases toward the exterior of the peripheral wall. The deflected gases flow along the spinner peripheral wall, thereby maintaining the peripheral wall and glass fibers emanating therefrom at temperatures suitable for proper fiberization.

In another specific embodiment of the invention, the opening is positioned in the spinner top wall, and the means for directing is positioned above the spinner top wall.

In a preferred embodiment of the invention, the means for directing comprises an annular member.

According to this invention, there is also provided apparatus for fiberizing molten mineral material comprising a spinner having a top wall, a bottom wall, and an orificed peripheral wall through which molten mineral material passes to form mineral fibers, a burner mounted to direct hot gases toward the interior side of the peripheral wall, an opening in the spinner top wall for venting the hot gases from the spinner, an opening in the spinner bottom wall for venting the hot gases from the spinner, means positioned above the spinner top wall for directing the vented hot gases toward the exterior of the peripheral wall, and means positioned beneath the spinner bottom wall for directing the vented hot gases toward the exterior of the peripheral wall.

According to this invention, there is also provided a method for fiberizing molten mineral material comprising supplying molten mineral material to a rotating spinner, centrifuging the molten mineral material into mineral fibers by passing the molten mineral material through the orificed peripheral wall of the spinner, directing hot gases toward the interior of the peripheral wall, venting the hot gases from the spinner, and directing the vented hot gases toward the peripheral wall.

In a preferred embodiment of the invention, the direction of the vented hot gases is changed so that they flow along the exterior of the peripheral wall.

According to this invention, there is also provided a method for fiberizing molten mineral material comprising supplying molten mineral material to a rotating spinner, centrifuging the molten mineral material into mineral fibers by passing the molten mineral material through the orificed peripheral wall of the spinner, directing hot gases toward the interior of the peripheral wall, venting the hot gases from both the top wall and the bottom wall of the spinner, and directing the vented hot gases toward the peripheral wall.

DESCRIPTION OF THE INVENTION

This invention will be described in terms of a glass fiber forming operation, although it is to be understood that the invention can be practiced using other heat softenable mineral material, such as rock, slag and basalt.

As shown in the drawing, spinner 10 is mounted for rotation on quill 12 and can be comprised of spinner bottom wall 14, spinner top flange 16, and spinner peripheral wall 18. The peripheral wall has orifices 20 positioned therein, and interior surface 22 and exterior surface 24. Molten glass 26, dropping into the spinner, impinges on the spinner bottom wall and flows to the spinner peripheral wall. The glass passes through the orifices to form glass fibers 28. Positioned exterior of the spinner can be an annular blower, such as blower 30, for providing additional attenuative force for the fibers.

One or more internal burners, such as burners 32, are mounted for distributing hot gases, such as the hot gases resulting from a combustion process, and directs the hot gases toward the interior of the spinner peripheral wall, the spinner bottom wall, and the molten glass within the spinner. The burners can be positioned within the spinner or, alternatively, positioned slightly above the spinner. The burners can also comprise one or more burner elements supplied with a combustible mixture via a manifold, not shown.

Positioned in the spinner is at least one opening for venting the hot gases from the spinner. Preferably, there is an opening in the bottom wall, such as bottom wall opening 34, and an opening in the top wall, such as top opening 36. More preferably, the bottom opening comprises a plurality of small holes positioned in the spinner bottom wall. Most preferably, 16 holes having a diameter of about 11/16 inches are employed. A means for directing the hot gases vented via the bottom wall opening, such as bottom shield 38, is positioned beneath the spinner bottom wall. The bottom shield can be an annular plate, and can be comprised of any material suitable for withstanding the high temperature of the fiber forming environment, such as stainless steel or other alloys well known in the art.

Annular space 39 is defined by the bottom shield and spinner bottom wall. A deflector member, such as bottom flame deflector 40, can be positioned at the outer edge of the bottom shield to deflect the vented gases toward the exterior of the peripheral wall. The changing of the direction of the vented gases by the bottom flame deflector causes the hot gases to flow along the exterior of the peripheral wall and thereby maintain the peripheral wall at a proper temperature for fiberization of the glass.

Positioned above the spinner top wall and the top opening is a means for directing the hot gases vented from the spinner via the top opening. The means can be any member suitable for deflecting the gases radially outwardly, such as top shield 42. Preferably, the top shield is annular in shape, and is mounted on a non-rotating member, such as refractory casing 43. The top shield can be adapted at its outer edge with a deflector member, such as top flame deflector 44, for deflecting the hot gases downwardly across the exterior of the peripheral wall. The top shield can be adapted with opening 46 to enable the molten glass to flow therethrough and reach the interior of the spinner. Likewise, openings or tubes 48 can be positioned in the top shield so that the burners can protrude down into the spinner.

As can be seen from the drawing, particularly noting the proximity of the top flame deflector to the blower, the invention is carried out in the absence of external heating means for heating the glass fibers and the exterior of the spinner peripheral wall.

EXAMPLE

A fiberizer for providing glass fibers was adapted with an internal burner to heat the glass and spinner bottom and peripheral walls. A top shield was employed to direct hot gases vented from a top spinner opening radially outwardly toward the spinner peripheral wall. The addition of the top flame deflector to the top shield resulted in an increase of about 30° to 40° F. in the temperature of the upper spinner peripheral wall, and resulted in a reduction in average fiber diameter of about 3 to 4 hundred thousandths inches. The addition of the bottom opening, bottom shield and bottom flame deflector reduced the temperature gradient on the spinner peripheral wall from about 150° F. to about 50° F.

INDUSTRIAL APPLICABILITY

This invention will be found to be useful in the formation of fibers for molten glass for such uses as glass fiber thermal insulation products and glass fiber acoustical insulation products.

I claim:

1. Apparatus for fiberizing molten mineral material comprising a spinner having an orificed peripheral wall through which the molten mineral material passes to form mineral fibers, a burner mounted to direct hot gases toward the interior of said peripheral wall, an opening in said spinner for venting the hot gases from said spinner, means for deflecting the vented hot gases radially outwardly toward said peripheral wall, and means for changing the direction of the vented hot gases to flow along the exterior of said peripheral wall in the absence of external heating means.

2. The apparatus of claim 1 in which said spinner has a bottom wall in which said opening is positioned, and in which said means for changing is positioned beneath said spinner bottom wall.

3. The apparatus of claim 2 in which said means for changing comprises an annular member.

4. The apparatus of claim 3 comprising a deflector member positioned at the outer edge of said annular member to change the direction of the vented gases upwardly.

5. The apparatus of claim 1 in which said spinner has a top wall in which said opening is positioned, and in which said means for changing is positioned above said spinner top wall.

6. The apparatus of claim 5 in which said means for changing comprises an annular member.

7. The apparatus of claim 6 comprising a deflector member positioned at the outer edge of said annular member to change the direction of the vented gases downwardly.

8. Apparatus for fiberizing molten mineral material in the absence of external heating means comprising a spinner having a top wall, a bottom wall, and an orificed peripheral wall through which molten mineral material passes to form mineral fibers, a burner mounted to direct hot gases toward the interior side of said peripheral wall, an opening in said spinner top wall for venting the hot gases from said spinner, an opening in said spinner bottom wall for venting the hot gases from said spinner, means positioned above said spinner top wall for deflecting the vented hot gases radially outwardly toward the exterior of said peripheral wall, means positioned beneath said spinner bottom wall for deflecting the vented hot gases radially outwardly toward the exterior of said peripheral wall, means for changing the direction of the hot gases vented from said top wall opening downwardly to flow along the exterior of said peripheral wall, and means for changing the direction of the hot gases vented from said bottom wall opening upwardly to flow along the exterior of said peripheral wall.

9. A method for fiberizing molten mineral material comprising supplying molten mineral material to a rotating spinner, centrifuging the molten mineral material into mineral fibers by passing the molten mineral material through the orificed peripheral wall of said spinner, directing hot gases toward the interior of said peripheral wall, venting the hot gases from said spinner, deflecting the vented hot gases radially outwardly toward said peripheral wall, and changing the direction of the vented hot gases so that they flow along the exterior of said peripheral wall in the absence of external heating means.

10. A method for fiberizing molten mineral material comprising supplying molten mineral material to a rotating spinner, centrifuging the molten mineral material into mineral fibers by passing the molten mineral material through the orificed peripheral wall of said spinner, directing hot gases toward the interior of said peripheral wall, venting the hot gases from both the top wall and the bottom wall of said spinner, deflecting the vented hot gases radially outwardly toward said peripheral wall, and changing the direction of the vented hot gases in the absence of external heating means so that the vented gases flow along the exterior of said peripheral wall.

* * * * *